United States Patent [19]

Mollenkopf et al.

[11] 4,118,176

[45] Oct. 3, 1978

[54] HEAT TREATMENT FOR FINE-GRAINED MATERIALS

[75] Inventors: Hans Mollenkopf, Neubeckum; Horst Ritzmann, Enniger; Jürgen Wurr, Ennigerloh; Heinz-Herbert Schmits, Rheda; Otto Heinemann, Ennigerloh; Karl Krützner, Jun., Neubeckum; Werner Schössler, Ahlen, all of Fed. Rep. of Germany

[73] Assignee: Polysius AG, Fed. Rep. of Germany

[21] Appl. No.: 774,881

[22] Filed: Mar. 7, 1977

[30] Foreign Application Priority Data

Mar. 17, 1976 [DE] Fed. Rep. of Germany ....... 2611239

[51] Int. Cl.² .............................................. F27B 15/00
[52] U.S. Cl. ....................................... 432/14; 432/106
[58] Field of Search ............................ 432/14, 15, 106

[56] References Cited

U.S. PATENT DOCUMENTS 3,904,353  9/1975  Bosshard et al. .................... 432/106
4,060,375  11/1977  Weber et al. .......................... 432/14

Primary Examiner—John J. Camby
Attorney, Agent, or Firm—Learman & McCulloch

[57] ABSTRACT

Fine-grained material adapted to be fired in a furnace is discharged from a preheater into a gas conduit extending from the furnace to the preheater and through which a stream of hot gases pass. The conduit is shaped to deflect the gas stream and concentrate it along one side of the conduit in the area of introduction of the material to the conduit. Below the area of introduction of material to the conduit fuel burners provide a heating zone through which the material falls. The concentration of the gas stream along one side of the conduit assures entrainment of the material in the gas stream and passage of the material again through the heating zone. Above the area of introduction of material to the conduit the latter is shaped to deconcentrate the gas stream and permit some of the material entrained therein again to fall downwardly through the heating zone, following which such material is reentrained in the gas stream.

18 Claims, 3 Drawing Figures

HEAT TREATMENT FOR FINE-GRAINED MATERIALS

This invention relates to apparatus for the heat treatment of fine granular material such as powdered raw cement. The apparatus is of the general class disclosed in U.S. Pat. No. 3,940,236 and includes a rotary kiln and a preheater formed of a number of cyclone stages through which flow the exhaust gases from the rotary kiln. A gas pipe leads from the rotary kiln to the lowermost cyclone stage and in the pipe there terminates a material feed line coming from the following cyclone stage. Beneath the terminal end of the feed line there is disposed a distributor member for breaking up the stream of material, and below the distributor member a fuel line opens into the gas pipe in such manner as to form a combustion zone extending over substantially the entire cross section of the gas pipe. A substantial portion of the material passes through the combustion zone.

In the manufacture of cement, alumina, lime, magnesite, dolomite and the like, the heat treatment of the fine granular material is frequently effected by first preheating the material in a preheater composed of a number of cyclones, using the hot exhaust gases from a rotary kiln, before the material is then finally fired or sintered in the rotary kiln. In such case the major part of the heating takes place in the rotary kiln, while only a lesser proportion of the total thermal energy is supplied to the material while in the preheater. Because of the greater specific capital costs of the rotary kiln this is not an optimal proportionment of the heating operation between the rotary kiln and the preheater.

In order to be able to make the rotary kiln smaller in cross section and/or length there has previously been disposed between the preheater and the kiln a prefiring zone wherein the preheated material is heated as highly as possible. The particular problem in the provision of such a prefiring zone is to ensure an extremely uniform supply of fuel to the material to prevent overfiring of individual particles, with all the consequent disadvantages such as caking, agglomerating, etc.

In one known plant the prefiring zone comprises a fluidized bed heated directly by burners. Another known plant uses a combustion chamber with the material and fuel entering the leaving tangentially. In both cases the exhaust gases from this prefiring zone combine with the exhaust gases from the rotary kiln. The disadvantage of these proposals lies in the high capital costs of the prefiring zone, whereby an appreciable amount of the savings made with the kiln are lost.

In a further known plant, in addition to the material outlet line from the penultimate cyclone stage, a fuel line and a cooler air outlet also terminate in the gas pipe leading from the rotary kiln to the cyclone preheater. In this manner the gas pipe which is in any case present between the rotary kiln and the cyclone preheater is utilized to provide the prefiring zone. However, it has here been found that a relatively large length of this gas pipe is needed to transfer to the granular material at least the major part of the heat energy from the additional fuel introduced into the gas pipe, before that material is deposited in the lowermost cyclone stage of the preheater. The capital costs and spatial requirements increase appreciably with the length of the gas pipe between the rotary kiln and the cyclone preheater.

In another known plant an upwardly widening shaft traversed by the rotary kiln exhaust gases and with two following cyclones is provided for preheating the material. Exhaust air from a cooler, heated by a burner, is also fed into the bottom portion of this shaft. The material separated in the first following cyclone is fed into the upper area of the shaft, and beneath its inlet point is disposed a further burner. With this known plant uniform mixing of fuel and material in the preheater shaft cannot be assured, since there is a risk of some particles of material being heated too much and others too little.

The disadvantages described above in known constructions are avoided in apparatus disclosed in the aforementioned patent in that beneath the terminal end of the material feed line there is disposed a distributor member for breaking up the stream of material, and below that distributor member the fuel line opens into the gas pipe in such manner as to form a combustion zone extending over substantially the entire cross section of the gas pipe, and through which at least a substantial portion of the material passes more than once.

The disposition of such a distributor member immediately below the material inlet and above the fuel line ensures that immediately on entering the gas pipe the fuel is to a great extent uniformly mixed with the particles of material, so that optimum combustion of the fuel ensures at or in the immediate vicinity of the individual particles. The extension of the combustion zone over the entire cross section of the gas pipe and the multiple passes of the material through this combustion zone also provide optimal conditions for intensive heat transfer from fuel to material.

In the further development of the apparatus disclosed in the aforementioned patent it has now been found desirable to intensify still further the heat treatment of the material in the vicinity of the precalcining zone (i.e., in the gas pipe between the rotary kiln and the lowermost cyclone stage), and also to improve still further the uniformity of the heat treatment of all the material particles.

According to the present invention this objective is attained by changing the direction of exhaust gas flow in the area of and below the terminal end of the material feed line and by locating the terminal end of the material feed line in that wall of the gas pipe which bounds the deflected gas stream on the outer side of the stream.

Because of the considerable deflection of the gas stream in the lower area of the gas pipe leading from the rotary kiln to the lowermost cyclone stage, the gas stream in the area of the deflection is irregularly distributed over the pipe cross section. In the outer portion of the pipe cross section the gas flow streamlets lie close together, while the inner portion of the pipe cross section constitutes a relatively calm zone as far as flow is concerned. But since with the device provided by the invention the material is introduced into the first mentioned cross-sectional area with the strong gas flow passing through, immediate entrainment of the material by the gas stream is ensured, and hence the material introduced cannot "shoot through" into the kiln.

On the other hand the cross-sectional portion of the gas pipe with the relatively weak flow enables the material initially entrained and raised by the gas to pass again through the combustion zone, this time from the top downwards, before the material is then entrained again by the gas stream in the lowest part of the gas pipe, and after passing again through the combustion zone is conveyed to the lowermost cyclone stage of the preheater.

The above described introduction of the material into a stream deflecting zone of the gas pipe thus ensures the individual material particles remaining a particularly long period in the precalcining zone; in the vicinity of this stream deflection the material particles execute a movement which can be figuratively called a "calcining circuit". Thus, with minimum heat consumption a very high level of precalcification or deacidification is achieved in the raw material, together with highly uniform heat treatment of the material supplied to the kiln from the cyclones in the lowermost cyclone stage.

Preferred aspects of the invention are the subject of the appended claims and will be explained in detail below with relation to embodiments shown in the drawings. In these:

Figure 1:
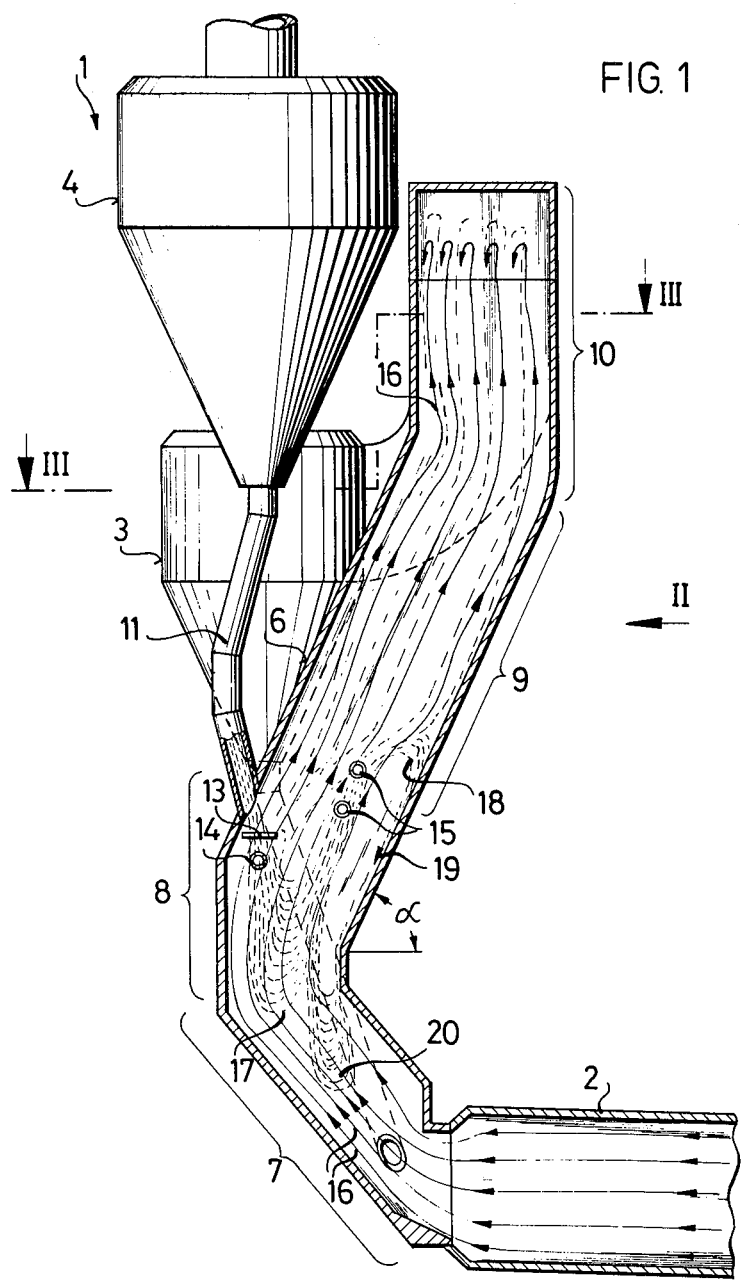
FIG. 1 is a partial section of apparatus constructed in accordance with the invention.
Figure 2:
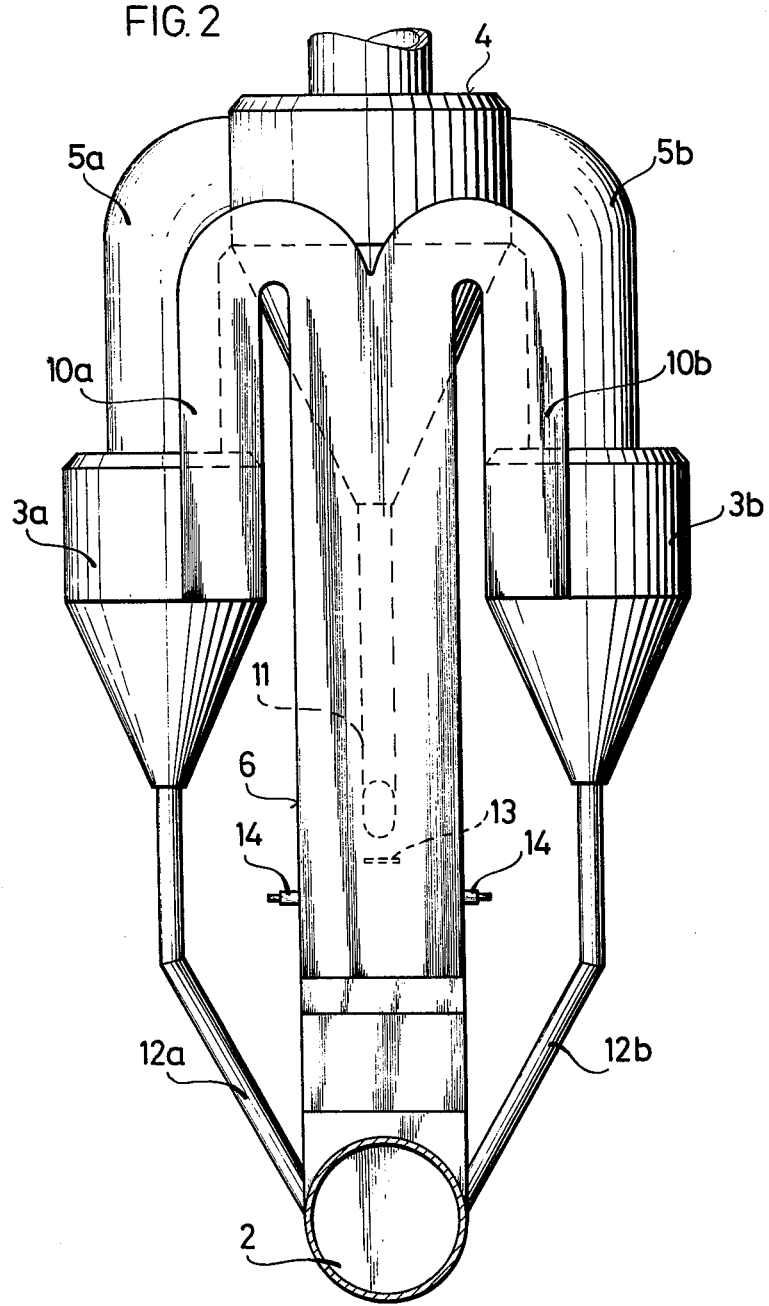
FIG. 2 is a view in the direction of arrow II in FIG. 1.
Figure 3:
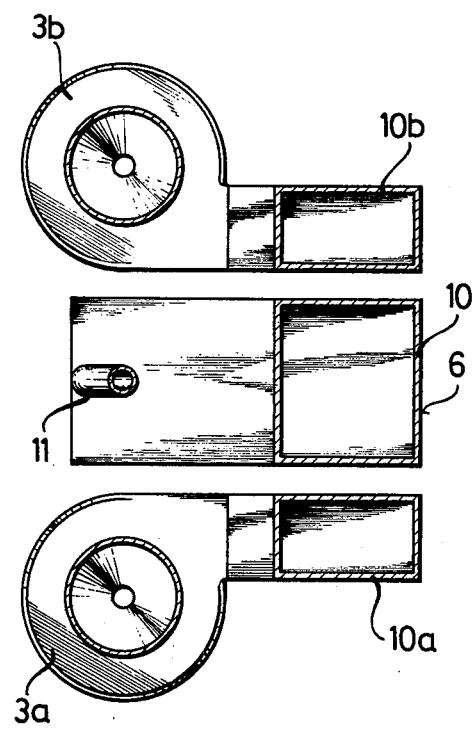
FIG. 3 is a section on the line III—III in FIG. 1.

The disclosed apparatus is used for the heat treatment of fine granular material, such as powdered raw cement, and comprises a preheater 1 (shown in part only) and a rotary kiln 2 (also only partially shown). The preheater 1 comprises a number of cyclone stages whereof only the two lowermost stages 3 and 4 are shown in the drawing. The cyclone stage 3 consists of two lower cyclones 3a, 3b, and the cyclone stage 4 of a single, centrally disposed, upper cyclone wherein the gas pipes 5a, 5b from the cyclones 3a, 3b enter tangentially from opposite sides.

The connection between the rotary kiln 2 and the cyclones 3a, 3b in the lowermost cyclone stage 3 is formed by a gas pipe 6, consisting in general of the following zones: a first zone 7 adjacent the rotary kiln 2 and which deflects the gas stream into a generally upward direction; a second zone 8 which deflects the gas stream still further vertically; a third zone 9, substantially straight, running at an angle $\alpha$ of 60°–70°, preferably about 65°, to the horizontal and overhanging the zone 7; a fourth zone 10, consisting of two lengths of pipe 10a, 10b leading with repeated changes of direction to the two cyclones 3a, 3b of the lowermost cyclone stage 3.

The material feed line 11 of the upper cyclone stage 4 terminates in the side of the gas pipe 6, at about the level of the point of transition from zone 8 to zone 9. The material feed lines 12a, 12b of the cyclones 3a, 3b in the lowermost cyclone stage 3 terminate in the bottom area of zone 7 in the gas pipe 6.

Below the level of the terminal end of the feed line 11 in the gas pipe 6 is an adjustable distributor member 13 operable to break up incoming material. The distributor is offset from the center of the pipe 6 so as to be closer to that side of the pipe through which material is introduced.

Somewhat below the distributor member 13 and also toward the one side of the pipe 6 are two burners 14 which form a combustion zone extending over substantially the entire cross section of the gas pipe 6. Additional burners 15 may be disposed at a level slightly above the distributor member 13 and in the central area of the pipe cross section.

As seen from the above description, the terminal or discharge end of the material feed line 11 in the gas pipe 6 is provided in that wall of the gas pipe which bounds the directionally deflected gas stream on the outer side of the stream.

In its third zone 9 the gas pipe 6 has a somewhat square cross section; the length of the zone being 2.5–4.5, preferably 3–3.5, times the inside cross-sectional dimension.

The length of the gas pipe 6, measured from the burner 14 to the entry into the cyclones 3a, 3b of the lowermost cyclone stage 3, is about 25–35 meters.

A speed of about 12–20 meters/second, preferably 15–17 meters/second, is chosen for the gas in gas pipe 6. The concentration of solid material in the gas pipe 6 is preferably 200–450 g/cubic meter, and preferably 250–300 g/cubic meter.

The operation of the device provided by the invention is as follows in the presently relevant area of the gas pipe 6.

The exhaust gases from the rotary kiln 2 pass through the gas pipe 6 in the general direction of the flow lines indicated by the arrows 16. Because of the stream deflection, especially in the area of the second zone 8 in gas pipe 6, the streamlets in the outer half of the pipe cross section are more closely compressed or intense than in the inner half. To a certain extent the gas stream is biased towards the gas pipe wall bounding the outside of the stream. The concentration of the gas stream thus is higher adjacent the left-hand side of the pipe and is lower at the opposite side thereof.

The preheated material deposited in the cyclone stage 4 passes via the feed line 11 into the gas pipe 6. The distributor member 13 ensures rapid and extensive breakup of the stream of introduced solid material. Since the material distributed in this manner immediately reaches the area of most intensive or concentrated gas flow, the cloud of material indicated at 17, after falling downwardly a short distance, through the heating zone of the burner 14, is upwardly entrained and hence passes again through the heating zone. Some of the material will pass on to the preheater through the auxiliary heating zone provided by the burners 15 if included. However, a considerable proportion of the material falls back into the straight zone 9 of the gas pipe (indicated at 18), since the gas stream after deflection is deconcentrated or again distributed approximately uniformly over the entire pipe cross section, which results in a drop in the mean gas speed. This material moves downward in the lower concentrated portion of the gas stream, mainly along the right-hand wall of gas pipe 6 as shown in FIG. 1, into zone 7 where, at the region indicated at 20, it again is entrained in the gas stream. The solid material again passes with this gas stream through the combustion zone and finally (provided it does not pass again through the "calcining circuit") enters cyclones 3a, 3b from which it is then conveyed via feed lines 12a, 12b into the rotary kiln.

The above description discloses how the deflection of the gas stream in the lower area of the gas pipe between the rotary kiln and the cyclone preheater, the mode of introducing the preheated material into the gas pipe, and the disposition of the combustion zone in the gas pipe provide an extremely long stay of the material in the precalcification zone, and hence a high and uniform level of deacidification of the raw material before its entry into the rotary kiln.

We claim:

1. In an apparatus for the further heat treatment of fine-grained material previously heated in a preheater and prior to firing said material in a furnace having an outlet, said apparatus comprising a walled conduit extending upwardly between said furnace and said preheater for conducting a stream of hot gas from the outlet of said furnace to said preheater at such velocity, with respect to the grain size of said material as to enable a substantial part of said material to be entrained in said gas stream; material inlet means communicating with said conduit adjacent one wall thereof for introducing material to said conduit at a first level such that said material may fall downwardly through said conduit; and means for combusting fuel in said conduit at a second level lower than said first level to provide at said second level a heating zone through which said material may fall, the improvement wherein said one wall of said conduit has a first portion inclined upwards between said furnace outlet and said second level for deflecting the stream of gas passing out of said outlet and establishing a concentration of said gas stream adjacent said one wall of said conduit thereby enhancing the entrainment of material in said stream to pass such material again through said heating zone, said gas stream having a relatively lower concentrated portion adjacent the opposite wall of said conduit.

2. Apparatus according to claim 1 wherein said conduit above said first level has straight wall portions to establish a substantially uniform intensity of said gas stream over the cross section of said conduit, whereby some of the material entrained in said gas stream is enabled to fall downwardly again adjacent said opposite wall of said conduit to a level below said heating zone for reentrainment in said gas stream.

3. Apparatus according to claim 1 wherein said conduit above said first level comprises a plurality of separate pipes.

4. Apparatus according to claim 3 wherein each of said pipes undergoes changes in direction.

5. Apparatus according to claim 1 including distributor means in said conduit adjacent said one wall thereof and below said inlet means for breaking up material introduced to said conduit.

6. Apparatus according to claim 1 wherein said fuel combusting means includes at least one fuel burner adjacent said one wall of said conduit.

7. Apparatus according to claim 1 including auxiliary fuel combusting means in said conduit at a level above said first level to provide an auxiliary heating zone.

8. Apparatus according to claim 1 wherein the length of said conduit above said second level is between about 25-35 meters.

9. Apparatus according to claim 1 wherein the velocity of said gas stream is between about 12 and 20 meters per second.

10. Apparatus according to claim 1 wherein said inclined wall is joined at its upper end to the lower end of an extension of said one wall that is substantially vertical, said extension communicating at its upper end with a further extension that is obliquely upwardly inclined and overhangs said inclined wall.

11. Apparatus according to claim 10 wherein said further extension is inclined at an angle of between 60° and 70° to the horizontal.

12. Apparatus according to claim 10 wherein said conduit in the region of said further extension is linear and has a substantially square cross section, the length of said conduit in said region corresponding substantially to its cross-sectional dimensions.

13. A method for the further heat treatment of fine-grained material previously heated in a preheater and prior to firing said material in a furnace having an upwardly extending hot waste gas conduit, said method comprising discharging hot gas in a stream from said furnace at a predetermined velocity, deflecting said stream upwardly through said conduit to establish a relatively highly concentrated portion thereof adjacent one side of said conduit and a relatively lesser concentrated portion adjacent the opposite side of said conduit; supplying fine-grained material having a grain size such that a substantial portion of said material will be entrained by said gas stream; introducing said material downwardly into said conduit at said one side thereof and at a first level between its upper and lower ends so that said material will fall downwardly through said conduit prior to being entrained in said stream; combusting fuel in said conduit at a second level lower than said first level to provide a heating zone through which said material passes as it falls downwardly and through which said material passes again following its being entrained in said stream; and terminating said deflection of said stream in the region of said first level to deconcentrate said concentrated portion of said stream whereby a portion of the material entrained in said stream may fall again through said conduit adjacent the opposite side thereof and be reentrained in said stream at a level below that of said heating zone for further passage through said heating zone.

14. A method according to claim 13 including maintaining said gas stream at a velocity of between about 12 and 20 meters per second.

15. A method according to claim 13 including maintaining said gas stream at a velocity of between about 15 and 17 meters per second.

16. A method according to claim 13 including maintaining the concentration of said material in said conduit between about 200-450 grams per cubic meter.

17. A method according to claim 13 including maintaining the concentration of said material in said conduit between about 250-300 grams per cubic meter.

18. A method according to claim 13 including combusting fuel in said conduit at a level above said first level to provide an auxiliary heating zone above the level at which said material is introduced to said conduit.

* * * * *